United States Patent
Goble

[11] Patent Number: 6,056,891
[45] Date of Patent: May 2, 2000

[54] DROP-IN PERFORMANCE INCREASING SUBSTITUTE FOR 1,1,1,2-TETRAFLUOROETHANE REFRIGERANT

[76] Inventor: George H. Goble, 286 W. Navajo, West Lafayette, Ind. 47906

[21] Appl. No.: 09/273,821

[22] Filed: Mar. 22, 1999

Related U.S. Application Data

[60] Provisional application No. 60/098,725, Sep. 1, 1998.
[51] Int. Cl.⁷ ...................................................... C09K 5/04
[52] U.S. Cl. .................................................. 252/67; 62/114
[58] Field of Search ................................. 252/67; 62/114

[56] References Cited

FOREIGN PATENT DOCUMENTS

| | | |
|---|---|---|
| 430170 | 6/1991 | European Pat. Off. . |
| 0 451 692 A2 | 10/1991 | European Pat. Off. . |
| 451692 | 10/1991 | European Pat. Off. . |
| 3-93890 | 4/1991 | Japan . |
| 93/05105 | 3/1993 | WIPO . |
| 93/15163 | 8/1993 | WIPO . |
| 94/00529 | 1/1994 | WIPO . |
| 94/17153 | 8/1994 | WIPO . |

OTHER PUBLICATIONS

Chemical Abstracts, AN 127:137554, "Replacement of R22 in a thermodynamiic system", Bailly et al., 1997.

Chemical Abstracts, AN 129:204589, "Optimal distribution of condenser area for retrofits", Johansson et al., 1998.

*Primary Examiner*—Christine Skane
*Attorney, Agent, or Firm*—Woodard, Emhardt, Naughton, Moriarty & McNett; Clifford W. Browning

[57] ABSTRACT

A method for producing refrigeration in a refrigeration system designed for R-134*a* including the step of drop-in substituting for the R-134*a* mixtures of R-152*a*, R-134*a* and R-125 to produce greatly improved performance in air conditioning systems designed to use only R-134*a* as the sole refrigerant fluid.

4 Claims, No Drawings

DROP-IN PERFORMANCE INCREASING SUBSTITUTE FOR 1,1,1,2-TETRAFLUOROETHANE REFRIGERANT

This application claims the benefit of prior filed copending Provisional Patent Application Ser. No. 60/098,725, filed Sep. 1, 1998.

The present invention relates to refrigerants generally, and more specifically to a mixture of refrigerants that may be substituted for 1,1,1,2-tetrafluoroethane (R-134a) to provide an increase in performance in automotive applications and stationary refrigeration applications that utilize R-134a.

BACKGROUND OF THE INVENTION

In order to provide a more compact format for identifying mixtures of refrigerants in the following discussions, mixtures of refrigerants will be listed in the form of:

R-ABC/DEF/GHI (N0/N1/N2) or

R-ABC/DEF/GHI (N0-N0'/N1-N1'/N2-N2')

which is a mixture of refrigerants (fluids) R-ABC, R-DEF, and R-GHI where N0, N1, and N2 are the weight percentages of each component fluid. The second form is similar, but specifies ranges of weight percentages of each of the component fluids, with the total being 100 percent. For this application, the following Table 1 discloses relevant single refrigerant R-numbers with their chemical names.

TABLE 1

| R-number | Chemical name |
| --- | --- |
| R-134a | 1,1,1,2-tetrafluoroethane |
| R-134 | 1,1,2,2-tetrafluoroethane |
| R-600a | isobutane (i-C4H10) |
| R-152a | 1,1-difluoroethane |
| R-227ea | 1,1,1,2,3,3,3-heptafluoropropane |
| R-125 | pentafluoroethane |
| R-142b | 1-chloro-1,1-difluoroethane |
| R-124 | 2-chloro-1,1,1,2-tetrafluoroethane |
| R-22 | chlorodifluoromethane |
| R-12 | dichlorodifluoromethane |

The automotive industry has switched away from the environmentally damaging refrigerant dichlorodifluoromethane (R-12) to 1,1,1,2-tetrafluoroethane (R-134a), beginning with the 1994 model year. Nearly all pre-1994 cars that were retrofitted from R-12 to R-134a refrigerant systems have had cooling performance problems. The 1994 and later model year cars were manufactured with R-134a refrigerant systems, in general. Some have performed well, and some have not. R-12 refrigeration systems used 500-viscosity mineral oil as a compressor lubricant. R-134a does not dissolve in (is not miscible with) mineral oil, so the mineral oil will not return to the compressor properly. New refrigeration systems lubricants were developed for R-134a, which were primarily polyalkylene glycol (PAG) based oils and polyol ester (POE) oils. The bulk of 1999 model year cars contain PAG oils. Chlorinated refrigerants, such as R-406A (R-600a/R-22/R-142b (4/55/41)) (see also U.S. Pat. No. 5,151,207) or R-12, cannot be directly used in systems that use PAG oils as almost all PAG oils are destroyed by chlorinated refrigerants. Only nonchlorinated components may be used in creating an R-134a substitute to avoid destruction of the PAG oil. However, a recently developed PAG oil, brand name Daphne® of Idemitsu Kosan Kabushiki, Tokyo, Japan (also known as "double end capped PAG oil"), has claimed to be able to tolerate chlorides and has even claimed to be able to run in R-12 systems without breakdown. This oil is not in widespread use at this time. Millions of cars have been and continue to be manufactured using the original, chloride sensitive PAG oils.

One option to improve the performance of a poorly performing R-134a refrigerant system is to painstakingly remove all the PAG oil by disassembling and flushing the system, including the compressor. Mineral oil can then be charged into the system along with R-406A, R-12 or any other blend refrigerant that offers a performance improvement over the performance of R-134a. This process is very labor intensive.

My currently co-pending U.S. patent application Ser. No. 08/820,843, filed Mar. 20, 1997, discloses several refrigerant mixtures for R-134a systems that can offer significant performance improvements over R-134a. These mixtures are zeotropic blends that create a "glide" or temperature range over which condensation and evaporation take place, increasing utilization of the condenser at rejecting heat and the evaporator at gaining heat. The optimum glide is in the range of 15–20° F. For optimum performance, one needs to bracket the boiling point of R-134a across it's normal operating range with a refrigerant blend comprised of components that boil above and below R-134a's boiling point in order to create the necessary glide. The refrigerant mixture disclosed in co-pending U.S. patent application Ser. No. 08/820,843 have created as much as a 10–12° F. lowering of air conditioning duct temperatures in real vehicles over that achieved with R-134a, alone.

R-134a boils at −14.8° F. at 1 atmosphere pressure. Suitable "high boilers" (around 0–+10° F.) are either very flammable (isobutane) or very expensive (R-227ea), or are not made in production quantities (R-134) (not to be confused with the R-134a isomer, which is massively produced).

A mixture disclosed in my co-pending U.S. patent application Ser. No. 08/820,843, sold under the trade name GHG-X7, comprised of R-227ea/152a/125 (55/5/40), has been used in R-134a automotive air conditioning systems for over two years with excellent results. Cold air supply duct temperatures are often in the 40° F. range compared to the mid to high 50° F. duct temperatures for R-134a. However, the R-227ea component is very expensive. It currently retails for about US$20 dollars per pound.

Hydrocarbon refrigerants (100% hydrocarbons) can be blended to replace R-134a, and these blends are compatible with PAG or POE oils (POE may thin out too much). A typical blend would be 60/40 by weight of propane/isobutane. These blends are highly flammable and are banned in about 18 states at the present time.

Another blend, R-414B, is claimed by its manufacturer to replace R-134a without regard to the type of oil present. R-414B is comprised of R-22/124/600a/142b (50/39/1.5/9.5). All components of R-414B, except the R-600a, are chlorinated fluids that can be expected to destroy the most common PAG oils used in automotive compressors. About 15 ml of R-414B was added to a 5 ml sample of GM part 1#15-118 PAG refrigerant oil for R-134a systems. The oil darkened overnight, and turned black by the fourth day.

No other prior art is known for specifically replacing R-134a in poor performing applications.

SUMMARY OF THE INVENTION

One object of the present invention is to provide a more cost-effective solution for replacing R-134a refrigerant with a better performing substitute.

Another object of the present invention is to provide an R-134a substitute with zero depletion of stratospheric ozone.

Another object of the present invention is to an R-134a substitute that is compatible with lubricants and materials used in R-134a systems.

Another object of the present invention is to an R-134a substitute that is nonflammable, or weakly flammable at worst, even after vapor leakage (fractionation).

Unlike replacements for R-12, R-134a substitutes do not have to be miscible in mineral oil. No hydrocarbons or other mineral oil return agents are needed. PAG and POE oils are miscible in the hydrofluorocarbon components of interest at evaporator temperature.

Among the most preferred embodiments of the present invention are mixtures of refrigerants which are drop-in performance increasing substitutes for 1,1,1,2-tetrafluoroethane (R-134a) refrigerant, comprising about 1–60 weight 1,1-difluoroethane, and about 1–80 weight percent 1,1,1,2-tetrafluoroethane, and about 1–60 weight percent pentafluoroethane, with the weight percentages of the components being weight percentages of the overall mixture.

Another preferred embodiment of the present invention is a method for producing refrigeration in a refrigeration system designed for a 1,1,1,2-tetrafluoroethane refrigerant comprising the step of drop-in substituting for said 1,1,1,2-tetrafluoroethane a mixture of about 1–60 weight percent 1,1-difluoroethane, about 1–80 weight percent 1,1,1,2-tetrafluoroethane, and about 1–60 weight percent pentafluoroethane, with the weight percentages of said components being weight percentages of the overall mixture.

DESCRIPTION OF THE PREFERRED EMBODIMENTS

For the purposes of promoting an understanding of the principles of the invention, reference will now be made to the embodiments described below and specific language will be used to describe the same. It will nevertheless be understood that no limitation of the scope of the invention is thereby intended, such alterations and further modifications in the described embodiments, and such further applications of the principles of the invention as described therein being contemplated as would normally occur to one skilled in the art to which this invention relates.

Mixtures comprised of about 35 weight percent R-125 and about 65 weight percent R-134a have been tried in automotive air conditioning systems. These mixtures offered only a 4 to 5° F. improvement in the cold air supply duct temperatures compared to R-134a. System head pressures where higher than R-134a, being about 300 PSIG at 95° F. ambient, while driving at highway speeds (40–60 mph). The head pressures for R-134a were 260–280 PSIG under the same conditions.

Since the boiling point of R-152a is −11.3° F. and the boiling point of R-134a is −14.9° F., one skilled in the art would assume that by replacing some of the R-134a in the above mixture with R-152a would only have a slight performance gain over the above mixture, since R-152a and R-134a boiling points are nearly the same. However, quite unexpected results were obtained from the refrigerant blends of Examples 1 and 2 below. It was hoped that a performance gain 5 or 6° F. over R-134a (GHG-X7 is 10–12° F. colder than R-134a) would be realized, but it was surprisingly discovered to be a much greater improvement than had been expected.

EXAMPLE 1
R-152a/134a/125 (25/35/40)

About 3 pounds of the above mixture of refrigerants were made by weighing each component into an automotive refrigerant-charging cylinder that had been evacuated to 100 microns of vacuum.

The initial vacuum was sufficient to draw in the R-152a component. The R-134a component was added next, and due to its lower boiling point (higher pressure) than R-152a, it readily flowed into the charging cylinder. Lastly the R-125 was added, slowly. R-125's high pressure quickly admitted it into the cylinder. After the components were added, the cylinder was shaken and rolled by hand to mix the components. A cylinder pressure of 125 PSIG at about 80° F. was noted.

The test car chosen was a 1990 Pontiac Transport, with a GM (Harrison) V5 variable displacement (continuous run) air conditioning compressor. This vehicle is instrumented with temperature and pressure gauges in the passenger compartment. This vehicle also has a huge windshield, about 19 square feet in area, that admits an estimated 1 to 2 kW of heat when in the sun. Start conditions were as follows: Sunny, ambient temperature 93° F., interior 100° F. About 1.75 pounds of the above mixture of refrigerants was charged into the system (this was determined to be close to the correct charge).

This car's refrigeration system contained mineral oil that is not miscible with R-134a or other hydrofluorocarbon blend components, however, tests could be conducted for several hours of run time for performance evaluation. Running in non miscible mineral oil for over a few hours would cause the mineral oil to leave the compressor and become trapped in the evaporator, thus starving the compressor for oil and causing it to fail. Between tests, about 20% of isobutane was added, or the system was charged with R-406A, and run for about 15 minutes to return any trapped mineral oil before testing the next hydrofluorocarbon blend.

The air conditioner was turned to "MAX" recirculate and the car was driven about 35 mph. Within about 1 minute duct temperatures were down into the 50° F. range. Driving about 4 miles at 50 MPH caused the duct temperatures to drop below 32° F. Head pressure remained lower than GHG-X7 at about 220 PSIG while driving, and about 280–310 PSIG while stopped.

This is excellent performance. It was too cold, however, and the evaporator would eventually freeze up with continued use. The performance of this mixture was reduced to prevent evaporator freeze up in Example 2.

EXAMPLE 2
(A Preferred Embodiment)
R-152a/134a/125 (25/40/35)

About 2.5 pounds of the above mixture of refrigerants were made in the manner disclosed in Example 1. About 1.75 pounds were charged into the same test car, operating under the same conditions as Example 1.

Driving head pressure came down to about 200 PSIG, and duct temperatures were in the 36–38° F. range on long drives (15–20 miles), on "MAX" fan re-circulation. A 36–38° F. range should be sufficient to prevent evaporator freeze up. For comparison GHG-X7, would produce 42–46° F. duct temperatures, while R-134a would be 50–55° F.

A second test run was conducted with the Example 2 refrigerant blend early the next morning, with ambient temperature about 70° F. Duct air temperature quickly dropped to about 42° F. and leveled off there. Head pressure was only 90–100 PSIG. The low head pressure reduced the amount of refrigerant in the evaporator and prevented it from freezing up.

The remaining 0.75 pounds of this mixture were vapor leaked (fractionated) from the charging cylinder. At periodic intervals, an ignition was attempted on slow gas exiting both the vapor and liquid ports of the charging cylinder. Near the end of the leak out some combustion did occur, as long as the ignition source (butane lighter flame) was present, but the combustion quickly ceased when the ignition source was removed. Combustion did not sustain itself.

EXAMPLE 3

About 2.5 pounds of the mixture of refrigerants of Example 2 were made in the manner disclosed in Example 1. About 1.4 pounds were charged into a 1997.5 AM General HUMMER vehicle. This vehicle has both front and rear evaporators, a GM HT6 compressor, and a Parker dryer (XH-9 desiccant) in the liquid line. The front evaporator is fed from a Chrysler "H-block" expansion valve, and the rear evaporator has a "normal" (flat topped) expansion valve. The front evaporator fan, on high position, moves about twice the amount of air as would a normal car. With 100° F. ambient temperature, inside duct temperatures ("MAX" recirculation position) on both evaporators was in the 42–45° F. range, during highway driving. When the ambient temperature dropped below about 92° F., the inside duct temperature lowered to about 39° F., and the compressor shut off due to the presence of a thermostat installed in the evaporators that turns off the compressor when 40° F. is reached. Upon rising to about 46° F., the thermostat closed and restarted the compressor.

During local hot and humid conditions, with ambient temperatures of 85–95° F., it was noted that cool air was being produced in about 15 or 20 seconds, about the amount of time to back out of a driveway. R-134a often took 2 or 3 miles of driving to produce similar cool air.

EXAMPLE 4
R-152a/134a/125 (25/43/32)

About 25 pounds of the above mixture of refrigerants were made in the manner disclosed in Example 1, except that a 26.2 pound water capacity refillable refrigerant cylinder was used in place of the charging cylinder. The cylinder was pre-chilled in liquid nitrogen for about 30 seconds before filling the components. About 1.75 pounds were charged into the same test car and under the same operating conditions as Example 1. Driving head pressure came down to about 200 PSIG, and duct temperatures were in the 42–46° F. range, similar to GHG-X7, but still colder than R-134a alone.

EXAMPLE 5

About 25 pounds of the mixture of Example 2 were made using the methods in Example 4. This cylinder was given to an automotive air conditioning technician skilled in the art. He removed R-134a from five vehicles and replaced the charge with the mixture of Example 2. These vehicles all had experienced unacceptable cooling performance with R-134a. All the vehicles had been charged with R-134a refrigerant at the time of manufacture. The Example 2 refrigerant delivered excellent cooling performance, even when the outside ambient temperatures were in the 95–100° F. range. Duct temperatures on "MAX" recirculate, on the highway, were often in the 36–38° F. range. It was also discovered that the correct charge amount for the Example 2 refrigerant was about 93% of the R-134a charge amount by weight.

EXAMPLE 6

About 25 pounds of the mixture of Example 2 were made using the methods in Example 4. This cylinder was given to an air conditioning technician skilled in the art. He installed it in a Cavalier Model 800 side by side commercial refrigerator/freezer serial no. SC122 that had been charged with R-134a since it was new. The R-134a had always produced marginal cooling performance, and had failed several board of health inspections on required cool down time when warm food was added. This system contained 9 oz of R-134a which was removed, and the system was evacuated with a refrigerant vacuum pump. About 8.5 oz of the Example 2 mixture was then charged to the system in liquid phase.

The cooling "pulldown" performance with the mixture of Example 2 was about one half the time that R-134a had taken. Compressor current draw was the same in each case, 1.8 amperes.

In summary, I have discovered a low cost group of refrigerant fluids (R-152a, R-134a, and R-125) that may be combined in novel ways to produce greatly improved performance in air conditioning systems designed to use only R-134a as the single refrigerant fluid.

I claim:

1. A method for producing refrigeration in a refrigeration system designed for 1,1,1,2-tetrafluoroethane refrigerant comprising the step of drop-in substituting for said 1,1,1,2-tetrafluoroethane a mixture of about 1–60 weight percent 1,1-difluoroethane, about 1–80 weight percent 1,1,1,2-tetrafluoroethane, and about 1–60 weight percent pentafluoroethane, with the weight percentages of said components being weight percentages of the overall mixture.

2. The method of claim 1 in which 1,1-difluoroethane is present in about 25 weight percent, 1,1,1,2-tetrafluoroethane is present in about 40 weight percent, and pentafluoroethane is present in about 35 weight percent.

3. The method of claim 1 in which 1,1-difluoroethane is present in about 25 weight percent, 1,1,1,2-tetrafluoroethane is present in about 35 weight percent, and pentafluoroethane is present in about 40 weight percent.

4. The method of claim 1 in which 1,1-difluoroethane is present in about 25 weight percent, 1,1,1,2-tetrafluoroethane is present in about 43 weight percent, and pentafluoroethane is present in about 32 weight percent.

* * * * *